United States Patent
Troxel (10) Patent No.: US 11,480,667 B2
(45) Date of Patent: Oct. 25, 2022

(54) SYSTEMS AND METHODS FOR PROVIDING AN INTEGRATED TCAS, TRANSPONDER, AND DME SYSTEM USING A DEDICATED DME ANTENNA

(71) Applicant: Aviation Communication & Surveillance Systems LLC, Phoenix, AZ (US)

(72) Inventor: James R. Troxel, Glendale, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 362 days.

(21) Appl. No.: 15/412,438

(22) Filed: Jan. 23, 2017

(65) Prior Publication Data

US 2017/0358227 A1    Dec. 14, 2017

Related U.S. Application Data (60) Provisional application No. 62/286,296, filed on Jan. 22, 2016.

(51) Int. Cl.
| | |
|---|---|
| G01S 13/74 | (2006.01) |
| G01S 13/78 | (2006.01) |
| G01S 13/933 | (2020.01) |
| G08G 5/04 | (2006.01) |
| H01Q 1/28 | (2006.01) |
| G08G 5/00 | (2006.01) |

(52) U.S. Cl.
CPC .......... *G01S 13/74* (2013.01); *G01S 13/785* (2013.01); *G01S 13/933* (2020.01); *G08G 5/0021* (2013.01); *G08G 5/04* (2013.01); *H01Q 1/28* (2013.01)

(58) Field of Classification Search
CPC ........ G08G 5/04; G08G 5/0021; G08G 5/045; G08G 5/0008; G08G 5/0013; G08G 5/0078; G01S 13/785; G01S 13/9303; G01S 13/782; G01S 13/74; G01S 13/93; G01S 13/933; H01Q 1/28
See application file for complete search history.

(56) References Cited

U.S. PATENT DOCUMENTS

| | | | |
|---|---|---|---|
| 5,212,813 A * | 5/1993 | Renaud | H01P 1/213 343/858 |
| 7,006,032 B2 * | 2/2006 | King | G01S 3/023 342/29 |

(Continued)

*Primary Examiner* — Matthew M Barker
(74) *Attorney, Agent, or Firm* — Dickinson Wright PLLC (57) ABSTRACT

Various avionics systems may benefit from appropriate integration of distance measurement equipment, traffic collision avoidance systems, and transponders, with the distance measurement equipment using a dedicated antenna. A system can include a transponder processor. The system can also include a top antenna receiver configured to connect to a top antenna. The transponder processor can be configured to communicate using the top antenna. The system can also include a bottom antenna receiver configured to connect to a first bottom antenna, wherein the transponder processor is configured to communicate using the first bottom antenna. The system can further include a distance measure equipment processor integrated with the transponder processor and configured to measure distance using a second bottom antenna.

12 Claims, 11 Drawing Sheets

(56) References Cited

U.S. PATENT DOCUMENTS

| | | | | |
|---|---|---|---|---|
| 7,525,474 B2* | 4/2009 | Carocari | ............... | G01S 13/785 |
| | | | | 342/30 |
| 7,535,405 B2* | 5/2009 | Hunter | ................. | H04B 1/0007 |
| | | | | 342/30 |
| 7,583,223 B2* | 9/2009 | Brandao | ................... | G01S 3/46 |
| | | | | 342/30 |
| 8,019,529 B1* | 9/2011 | Sharma | ................... | G08G 5/06 |
| | | | | 701/117 |
| 8,344,935 B1* | 1/2013 | Hoffmann | ............... | H01Q 1/28 |
| | | | | 342/30 |
| 8,593,330 B2* | 11/2013 | Jones | ................. | G01S 13/9303 |
| | | | | 342/30 |
| 9,405,005 B1* | 8/2016 | Arteaga | ................... | G01S 13/91 |
| 9,478,140 B2* | 10/2016 | Kathirvel | ............ | G08G 5/0043 |
| 9,513,376 B1* | 12/2016 | Heinrich | ................ | G01S 19/45 |
| 9,857,461 B2* | 1/2018 | Stayton | ................ | G01S 13/785 |
| 10,001,376 B1* | 6/2018 | Tiana | ................... | G01C 21/005 |
| 2005/0156777 A1* | 7/2005 | King | ....................... | G01S 3/023 |
| | | | | 342/29 |
| 2008/0068250 A1* | 3/2008 | Brandao | ................... | G01S 3/46 |
| | | | | 342/30 |
| 2008/0238759 A1* | 10/2008 | Carocari | ............... | G01S 13/785 |
| | | | | 342/47 |
| 2010/0171647 A1* | 7/2010 | Naravanamurthy | .. | G01S 13/767 |
| | | | | 342/37 |
| 2010/0253565 A1* | 10/2010 | Piesinger | ............. | G01S 13/784 |
| | | | | 342/29 |
| 2016/0013923 A1* | 1/2016 | Malaga | ................... | H04L 5/14 |
| | | | | 370/277 |

\* cited by examiner

SYSTEMS AND METHODS FOR PROVIDING AN INTEGRATED TCAS, TRANSPONDER, AND DME SYSTEM USING A DEDICATED DME ANTENNA

CROSS-REFERENCE TO RELATED APPLICATION

This application is related to and claims the benefit and priority of U.S. Provisional Patent Application No. 62/286,296, filed Jan. 22, 2016, the entirety of which is hereby incorporated herein by reference.

BACKGROUND

Field

Various avionics systems may benefit from appropriate integration of distance measurement equipment, traffic collision avoidance systems, and transponders, with the distance measurement equipment using a dedicated antenna.

Description of the Related Art

Figure 1:
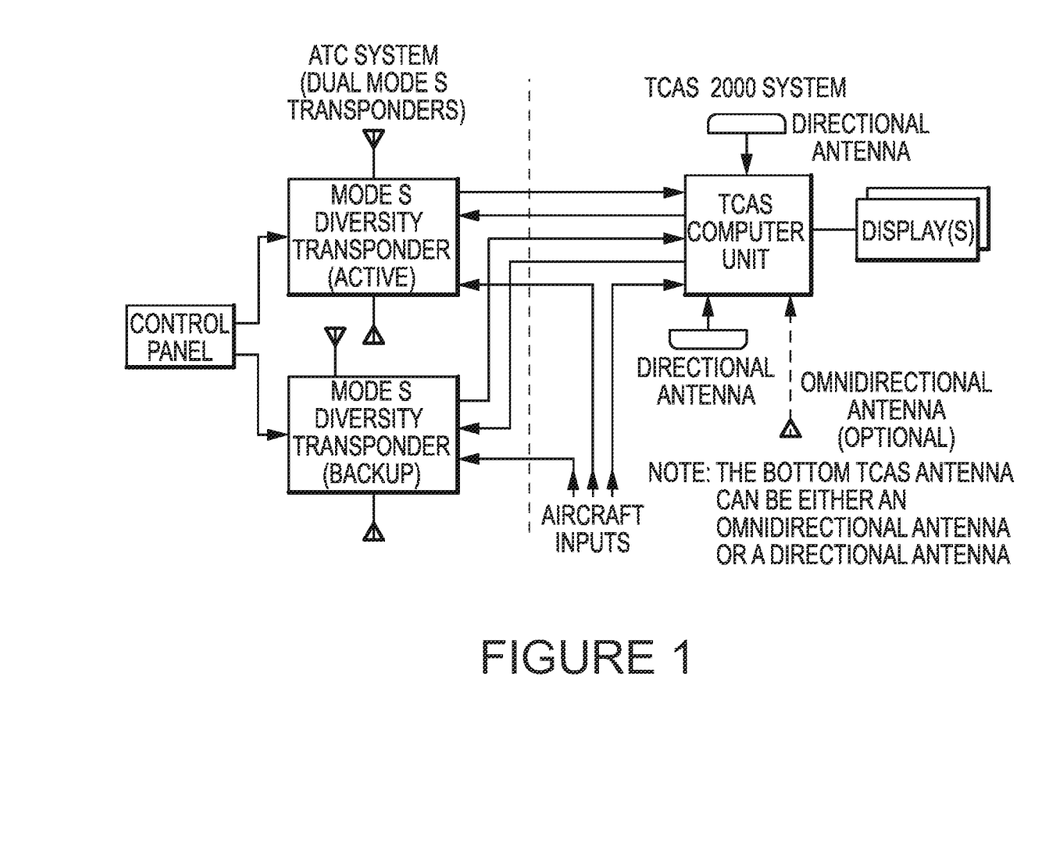
FIG. 1 illustrates a simplified block diagram of a typical installed traffic collision avoidance system or traffic alert and collision avoidance system (TCAS) system.
Figure 2A:
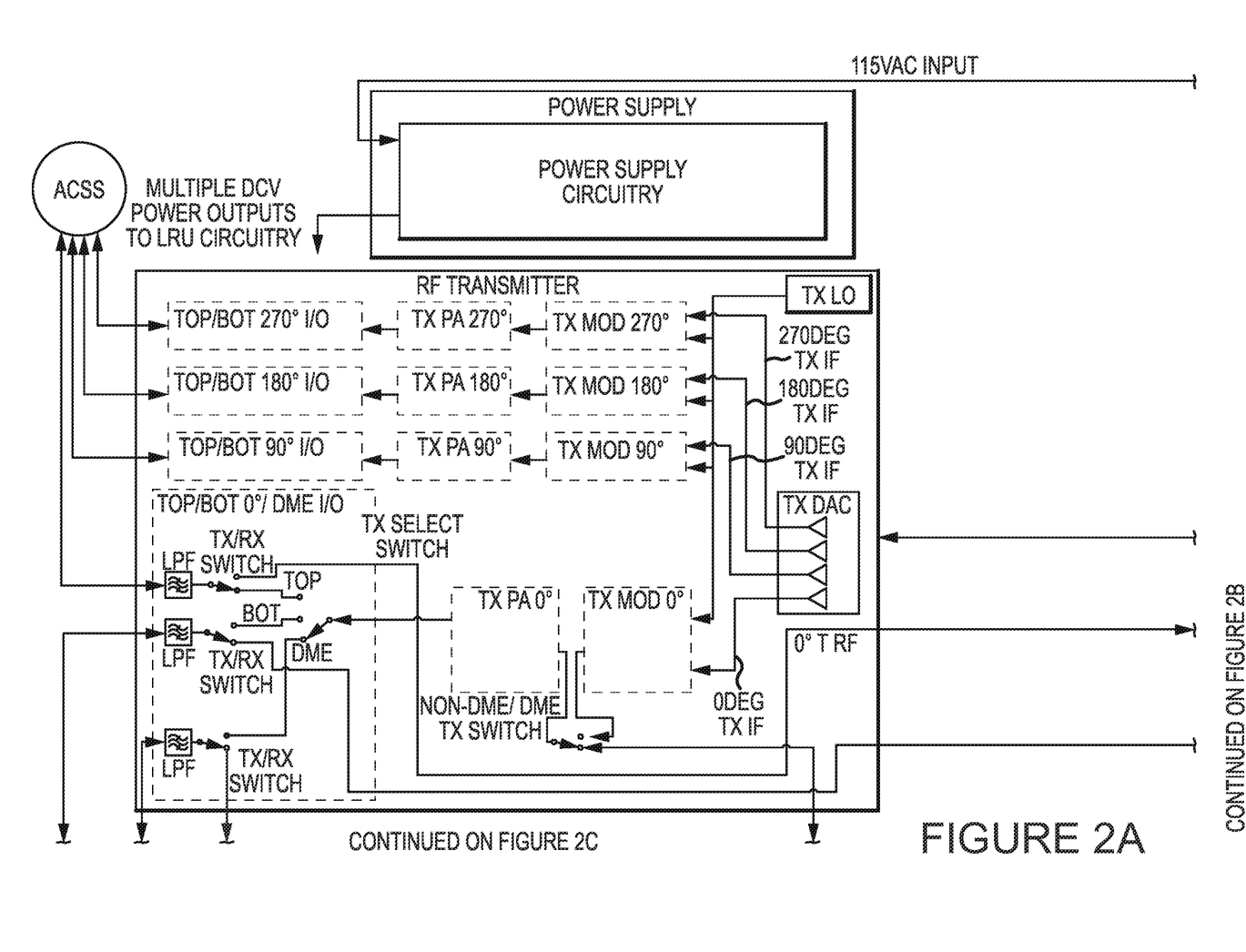
Figure 2B:
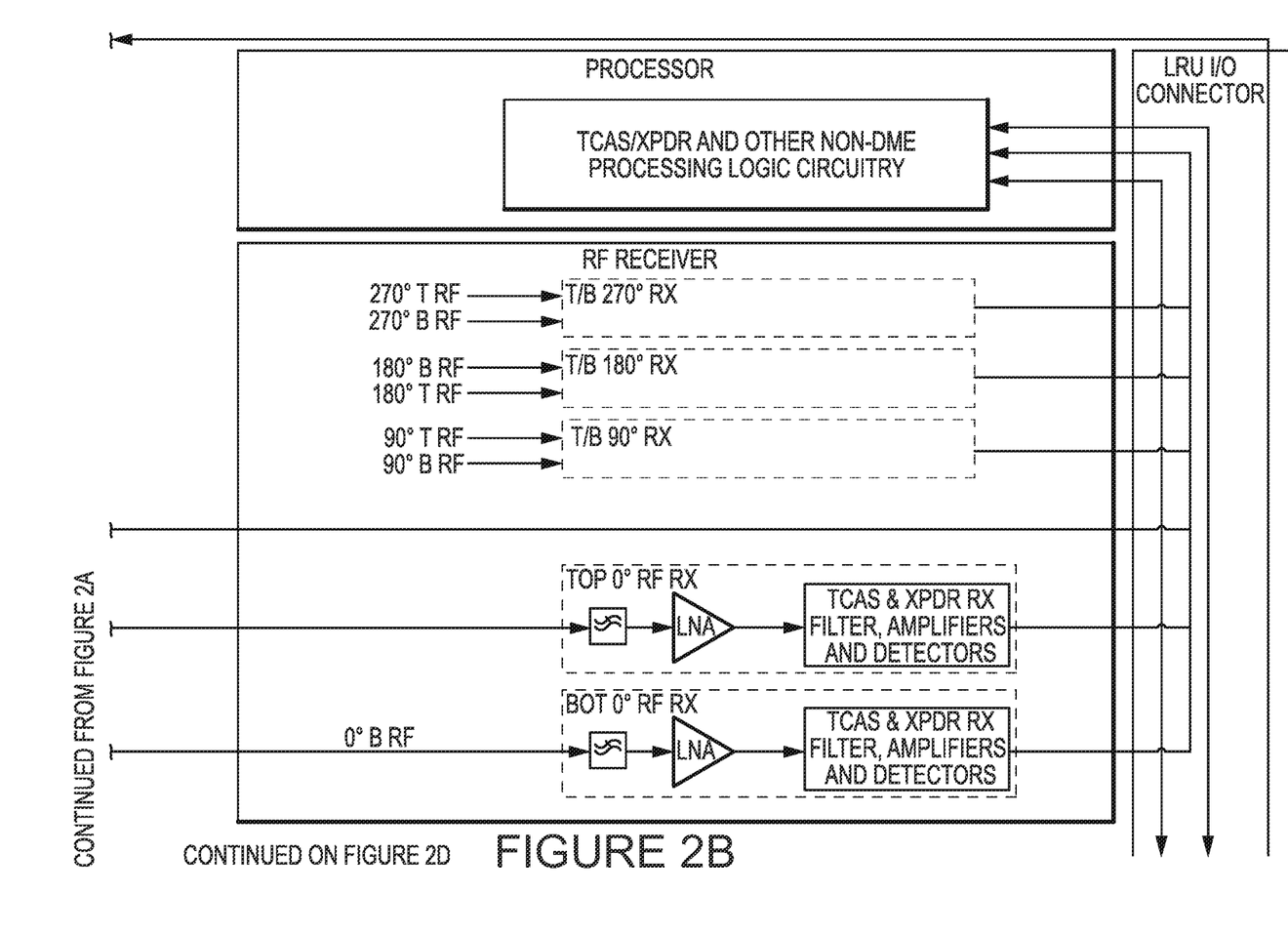
Figure 2C:
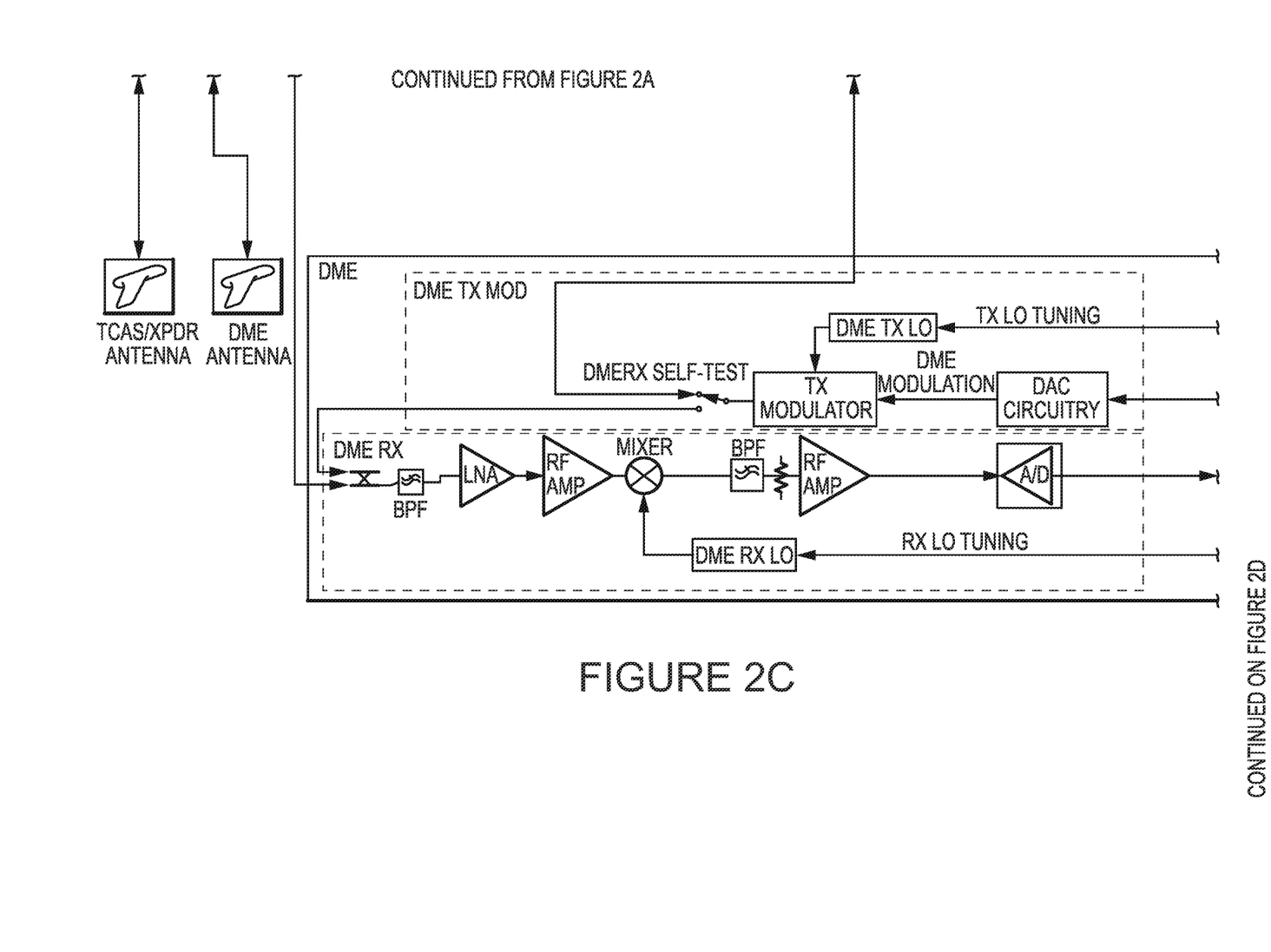
Figure 2D:
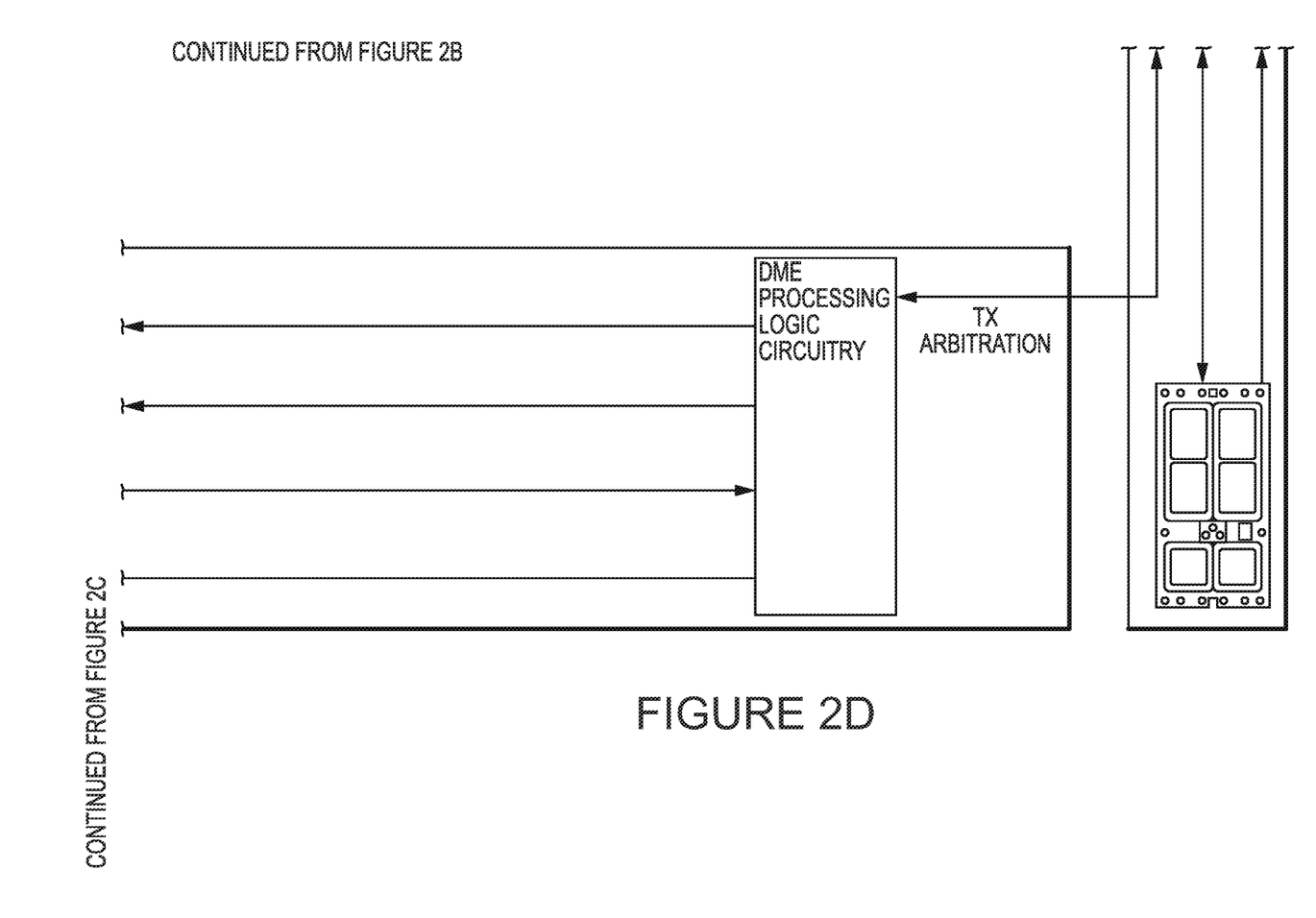
Figure 3A:
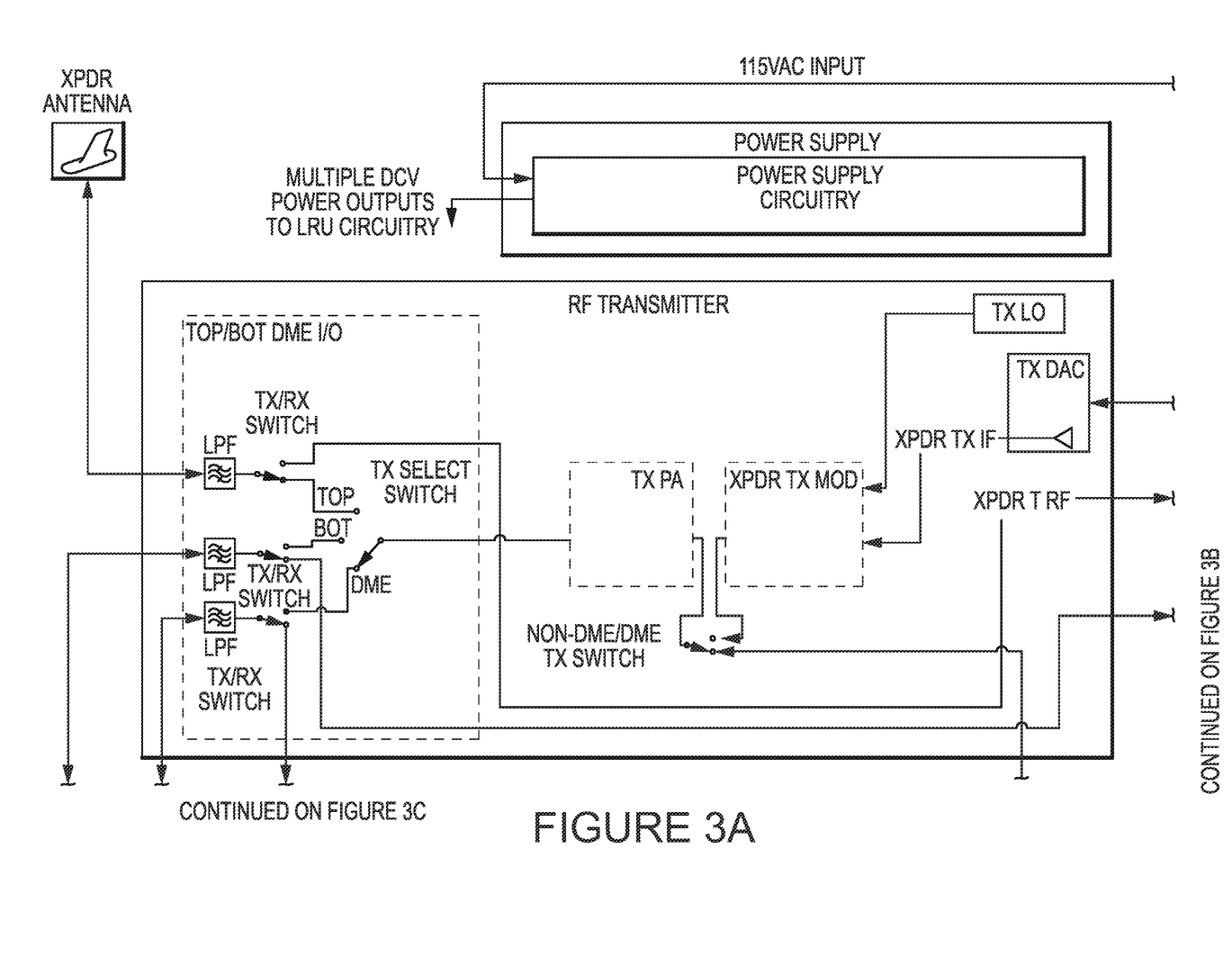
Figure 3B:
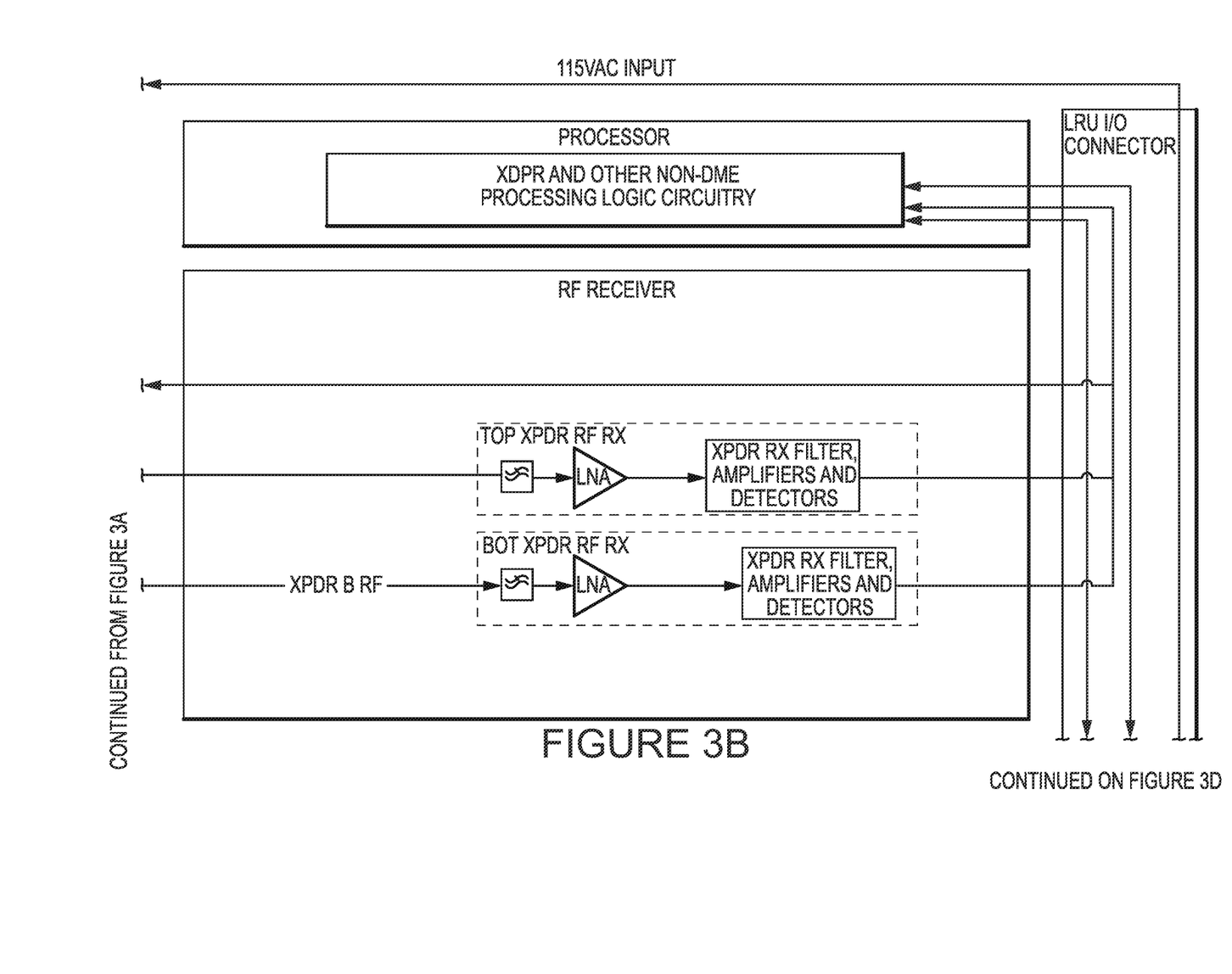
Figure 3C:
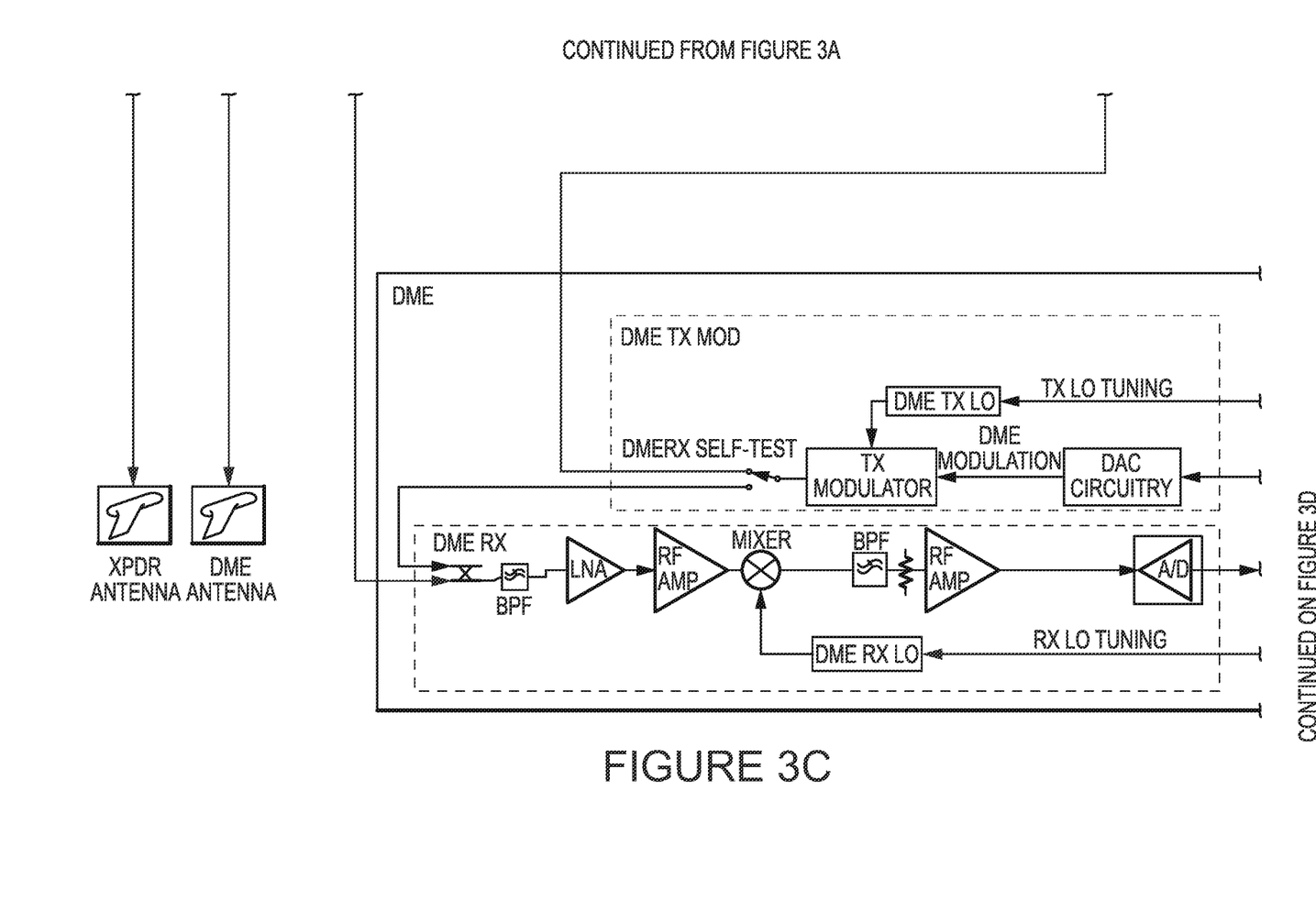
Figure 3D:
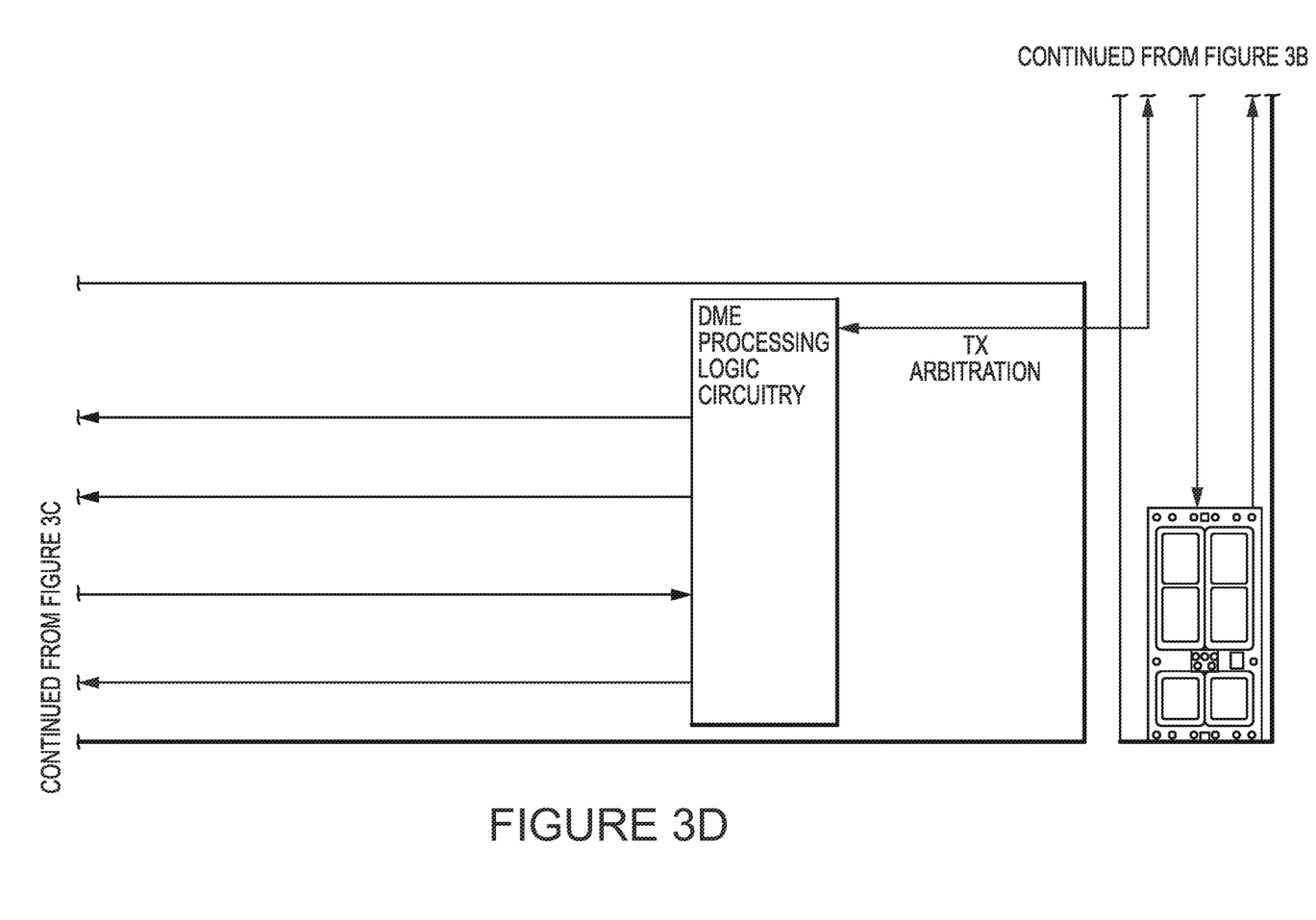

FIG. 1 illustrates a simplified block diagram of a typical installed traffic collision avoidance system or traffic alert and collision avoidance system (TCAS) system. TCAS-II systems which are approved to TSO-C119 and meet requirements in Radio Technical Commission for Aeronautics (RTCA) document DO-185 may require top and bottom antennas connected to the TCAS computer unit for generating interrogations to airborne intruders and processing replies from the intruder's transponder system (e.g., Mode S, air traffic control radar beacon system (ATCRBS), or identification, friend or foe (IFF)).

The TCAS-II system may perform most interrogation and reply processing out of the top L-band directional antenna, per the DO-185 Minimum Operational Performance Specification (MOPS). The bottom L-band antenna may be required in order to provide adequate surveillance coverage when the top antenna's performance is degraded due to aircraft geometry or other obstructions. DO-185 may require the top antenna to be directional and perform directional interrogation and reply processing; however, the bottom antenna may either be directional or omnidirectional.

TCAS-II systems may operate with either a bottom L-band directional or L-band omnidirectional antenna. TCAS-II systems may be employed on a number of different aircraft types with a bottom omnidirectional antenna and provide desired performance. One advantage of employing a bottom omnidirectional antenna is a significant installation cost and weight savings. The omnidirectional antenna's cost is a fraction of the cost of a directional antenna. In addition, a directional antenna requires 4 coaxial cables between the TCAS computer unit and the antenna. An omnidirectional antenna reduces this to a single coaxial cable.

As shown in FIG. 1, an aircraft may include transponders, such as Mode S diversity transponders that are separate from the TCAS system. Mode S transponders can be approved to DO-181. Typically, the Mode S diversity transponders have their own antennas, and may communicate across an interface to the TCAS system. In the case of products in which the TCAS and transponder (XPDR) are integrated, they share the same antennas. Both systems may require top and bottom (diversity) antennas connected to the TCAS and transponder units.

Distance measuring equipment (DME) (not shown in FIG. 1) which is approved to TSO-C66 and meets requirements in RTCA document DO-189 may use a bottom L-band omnidirectional antenna. Since L-band omnidirectional antennas have a wide frequency response, many of the commercially available antennas will meet the requirements of multiple L-band systems (e.g., TCAS, transponder, DME) and therefore will have multiple TSO approvals for the various systems.

SUMMARY

According to certain embodiments, a system can include a transponder processor. The system can also include a top antenna receiver configured to connect to a top antenna. The transponder processor can be configured to communicate using the top antenna. The system can also include a bottom antenna receiver configured to connect to a first bottom antenna, wherein the transponder processor is configured to communicate using the first bottom antenna. The system can further include a distance measure equipment processor integrated with the transponder processor and configured to measure distance using a second bottom antenna.

In certain embodiments, a method can include receiving a first transponder signal at a transponder processor via a top antenna and top antenna receiver. The method can also include receiving a second transponder signal at the transponder processor via a first bottom antenna and a bottom antenna receiver. The method can further include performing a distance measure equipment function at a distance measure processor using a second bottom antenna. The distance measure processor can be integrated with the transponder processor.

An apparatus, according to certain embodiments, can include means for receiving a first transponder signal at a transponder processor via a top antenna. The apparatus can also include means for receiving a second transponder signal at the transponder processor via a first bottom antenna. The apparatus can further include means for performing a distance measure equipment function at a distance measure processor using a second bottom antenna, wherein the distance measure processor is integrated with the transponder processor.

BRIEF DESCRIPTION OF THE DRAWINGS

For proper understanding of the invention, reference should be made to the accompanying drawings, wherein:

FIG. 2 (collectively comprising FIGS. 2A, 2B, 2C and 2D) illustrates a combined TCAS-II and Mode S transponder system (TCAS/XPDR) with an integrated DME function, according to certain embodiments of the present invention.

FIG. 3 (collectively comprising FIGS. 3A, 3B, 3C and 3D) illustrates a Mode S transponder system (XPDR) with an integrated DME function, according to certain embodiments of the present invention.

DETAILED DESCRIPTION

In order to provide increased integration in aircraft avionics and reduce the cost and weight, or for other reasons, it may be desirable to integrate a DME function into existing systems, such as a TCAS and/or Mode S Transponder system. This integration may remove effectively remove a DME unit as a line replaceable unit from the aircraft and may allow the TCAS and DME system to share common resources, such as radio frequency (RF), processing, and input/output (I/O) functions. In addition to the utilization of one or two Mode S Transponders and a TCAS-II computer unit, most commercial aircraft may utilize two DME systems, which may be the approximate size, weight and cost of a Mode S Transponder. By integrating the DME function into a TCAS or a Mode S Transponder system, one may remove two DME units and provide a significant cost and weight savings.

Certain embodiments of the present invention, as described herein, may provide for a DME system integrated into a TCAS-II and/or Mode S transponder system. The integrated DME/TCAS-II or DME/XPDR may share internal resources, such as a common transmitter, while providing two independent bottom L-Band omnidirectional antennas, where one of the independent antennas may be used for either or both the TCAS-II or Mode S transponder functions and the second independent antenna may be used for the DME function.

One possible reason for potentially providing separate DME and TCAS/XPDR antennas may be the effect on the DME receiver architecture. While the TCAS-II receiver may operate at 1090 MHz, and while the Mode S Transponder receiver may operate at 1030 MHz, the DME receiver may be tunable from 960 to 1215 MHz with 1 MHz channel spacing. A common antenna that may be used for TCAS/XPDR and DME functions may require a receiver architecture that has a broad bandwidth, since all three functions may simultaneously receive signals. This may present a technical problem, since typical DME receiver architectures may have a tuned pre-selector filter prior to a low-noise amplifier (LNA), which may eliminate out-of-band signals. A receiver designed for a DME with this architecture would not be useable for integrating with a TCAS-II or Mode S Transponder system. Adding a separate antenna for the DME may eliminate this constraint on the system design.

Example embodiments of the present invention are shown in FIGS. 2 and 3. FIG. 2 illustrates a combined TCAS-II and Mode S Transponder system (TCAS/XPDR) with an integrated DME function, according to certain embodiments of the present invention. FIG. 3 illustrates a Mode S Transponder system (XPDR) with an integrated DME function, according to certain embodiments of the present invention. Both systems may have a separate bottom L-Band omnidirectional antenna dedicated for the DME function.

The TCAS/Mode S Transponder system (TCAS/XPDR) block diagram of FIG. 2 can help to illustrate certain embodiments of the present invention. The Mode S Transponder system block diagram of FIG. 3 may work in a similar manner to the combined TCAS/Mode S Transponder of FIG. 2.

The TCAS/XPDR system may provide the following circuitry by which the TCAS-II and Mode S Transponder functions may be implemented: power supply, processor, transmitter, receiver and I/O connector. The RF transmitter may be connected to a top directional antenna, and two bottom omnidirectional antennas may be coupled through RF I/O circuit blocks. One bottom (BOT) antenna may be dedicated for the TCAS-II and Mode S transponder function, while the other bottom antenna may be dedicated for the DME function. TCAS-II and Mode S Transponder transmissions on the bottom TCAS/XPDR omnidirectional antenna may be performed through a power amplifier (TX PA 0 degree (DEG)) connected to the antenna through the TOP/BOT 0 DEG/DME I/O switch block. The bottom TCAS/XPDR omnidirectional antenna may be connected through the TOP/BOT 0 DEG/DME I/O switch block diagram to the TCAS/XPDR Bottom 0 degree receiver block on the RF Receiver for receiving signals for the TCAS-II and Mode S Transponder function.

The DME function may be added to the system as additional circuitry which may perform the DME processing, system I/O, receiver and transmitter modulation functions. In exemplary embodiments of the present invention, the DME function may share the L-band transmitter with the TCAS-II/Mode S Transponder function. The TX PA 0 degree power amplifier may have an RF switch at the input that may allow either the TCAS-II/Mode S Transponder modulator to be connected to the amplifier (TX MOD 0) or the DME modulator to be connected to the amplifier (DME TX MOD). The output of the TX PA 0 block may be connected to either the bottom TCAS/XPDR omnidirectional antenna or the bottom DME omnidirectional antenna through the TOP/BOT 0 DEG/DME I/O block. The TCAS and Mode S receiver low noise amplifier (LNA) for the RF receiver may be connected to the bottom TCAS/XPDR omnidirectional antenna through the TOP/BOT 0 DEG/DME I/O block. The DME receiver low noise amplifier (LNA) may be connected to the bottom DME omnidirectional antenna through the TOP/BOT 0 DEG/DME I/O.

Other embodiments of the present invention are possible, which may include but are not limited to a single unit which may contain separate transmitters for the TCAS-II/Mode S Transponder and DME functions, each of which may be connected to their own bottom omnidirectional L-Band antennas.

Other embodiments of the present invention may provide for an integrated TCAS-II/DME system that may employ a bottom directional antenna system for the TCAS-II processing and a bottom omnidirectional antenna system for the DME processing function.

Other embodiments of the present invention may provide for an integrated TCAS-II/Mode S transponder and DME system that may employ a bottom directional or omnidirectional antenna system for the TCAS-II and Mode S transponder processing and a bottom omnidirectional antenna system for the DME processing function.

Other embodiments of the present invention may provide that the DME and TCAS-II and/or Mode S transponder functions may be integrated on the same circuit cards and assemblies, and share common receiver, transmitter modulation, processing, power supply, and system I/O functions.

Other embodiments of the present invention may provide for an integrated TCAS-II and/or Mode S transponder and DME system that may implement other functions that also share or have separate resources for implementing the functions.

Figure 4:
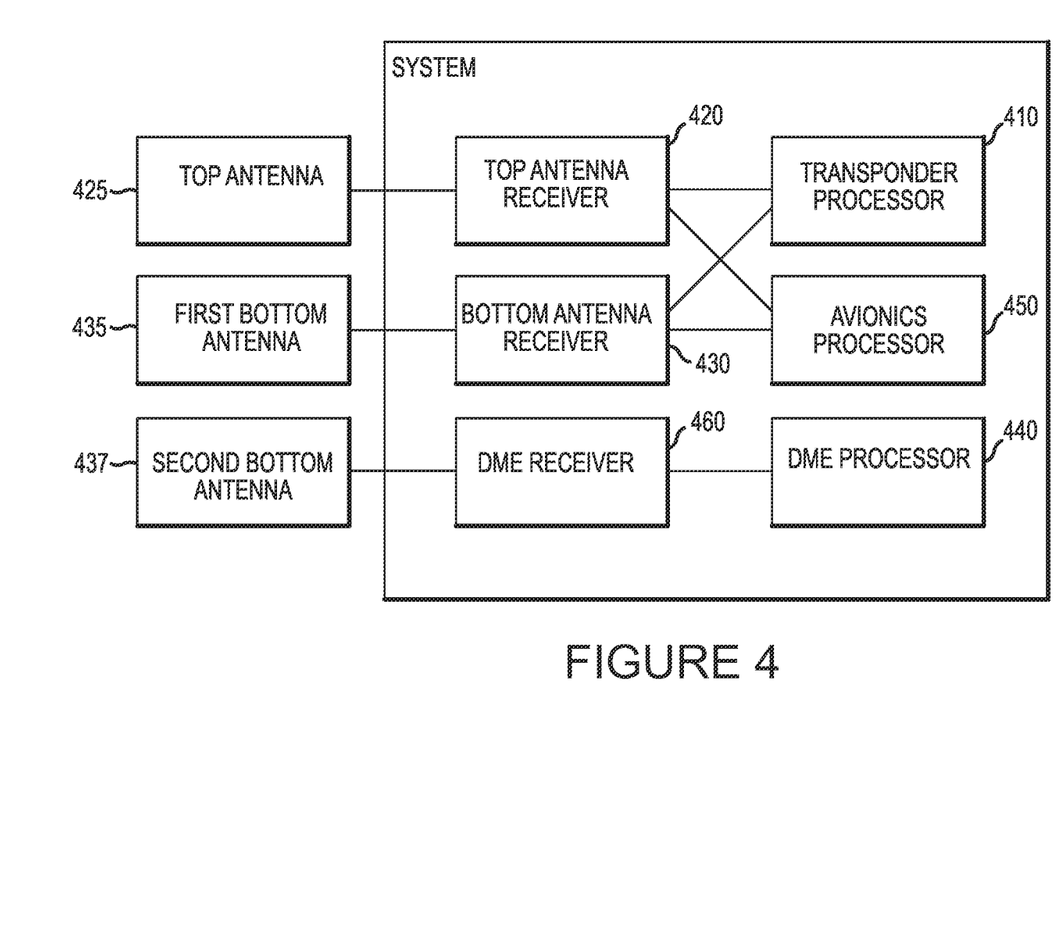
FIG. 4 illustrates a system according to certain embodiments.

FIG. 4 illustrates a system according to certain embodiments. The system of FIG. 4 may broadly encompass, for example, the systems illustrated in FIGS. 2 and 3.

As shown in FIG. 4, a system can include a transponder processor 410. The system can also include a top antenna receiver 420 configured to connect to a top antenna 425. The transponder processor 410 can be configured to communicate using the top antenna 425.

The system can also include a bottom antenna receiver 430 configured to connect to a first bottom antenna 435. The transponder processor 410 can be configured to communicate using the first bottom antenna 435.

The system can further include a distance measure equipment processor 440 integrated with the transponder processor 410 and configured to measure distance using a second bottom antenna 437. The second bottom antenna 437 may be used exclusively for distance measure functions, and not for transponder functions.

The system can also optionally include an avionics processor 450 configured to communicate using the top antenna 425 and the first bottom antenna 435. The avionics processor 450 can be integrated with the transponder processor 410 and the distance measure equipment processor 440.

The avionics processor 450 can be a processor of a traffic collision avoidance system or a traffic alert and collision avoidance system. Alternatively, the avionics processor 450 can be a processor of a traffic awareness system or ADS-B IN system.

The transponder processor 410, top antenna receiver 420, bottom antenna receiver 430, and distance measure equipment processor 440 can be provided as a single line replaceable unit. The avionics processor 450 can also be included in the same line replaceable unit.

The distance measure equipment processor 440 can be provided on a different circuit card assembly from the transponder processor 410. The distance measure equipment processor 440 can be provided on a same circuit card assembly as a distance measure equipment receiver 460.

The distance measure equipment processor 440 and the transponder processor 410 can be implemented on a same chip or a same circuit card assembly. The avionics processor 450 can also be implemented on the same chip or the same circuit card assembly with the distance measure equipment processor 440 and the transponder processor 410.

Likewise, a single transmitter or a single receiver, or both, may be shared among the transponder, the avionics, and the DME functions. Thus, there may be a reduction in the amount of hardware components used to implement certain embodiments of the present invention.

Other equipment such as power supply and LRU interface equipment can be shared among the transponder, avionics, and DME functions. Thus, transponder, TCAS, and DME can serve as a single LRU in certain embodiments of the present invention.

For example, as shown in FIGS. 2 and 3, a single LRU I/O connector can be used to interface to a power supply, transponder processor and/or avionics processor, RF receiver, RF transceiver, and DME transceiver and processor.

Figure 5:
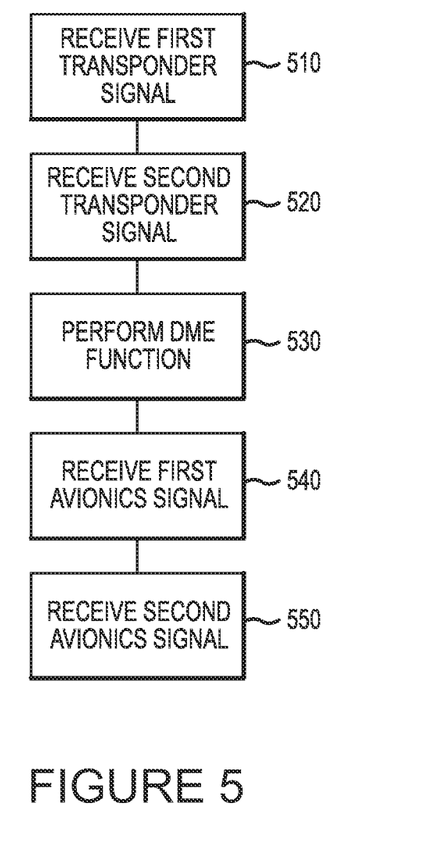
FIG. 5 illustrates a method according to certain embodiments.

FIG. 5 illustrates a method according to certain embodiments of the present invention. The method of FIG. 5 may be implemented by the systems illustrated in FIGS. 2, 3, and 4.

As shown in FIG. 5, the method can include, at 510, receiving a first transponder signal at a transponder processor via a top antenna and top antenna receiver. The method can also include, at 520, receiving a second transponder signal at the transponder processor via a first bottom antenna and a bottom antenna receiver. The method can further include, at 530, performing a distance measure equipment function at a distance measure processor using a second bottom antenna. The distance measure processor can be integrated with the transponder processor.

The method can also include, at 540, receiving a first avionics signal at an avionics processor via the top antenna. The method can further include, at 550, receiving a second avionics signal at the avionics processor via the first bottom antenna. The avionics processor can be integrated with the transponder processor and the distance measure equipment processor.

As described above, the avionics processor can be a traffic collision avoidance system or traffic alert and collision avoidance system. Alternatively, the avionics processor can be a traffic awareness system or ADS-B IN system.

The transponder processor, top antenna receiver, and bottom antenna receiver can be provided as a single line replaceable unit together with a distance measure equipment receiver and the distance measure equipment processor. The avionics processor can also be included in the same single line replaceable unit.

The distance measure equipment processor can be provided on a different circuit card assembly from the transponder processor. The distance measure equipment processor can also be provided on a different circuit card assembly from the avionics processor. Likewise, the avionics processor can be on a different circuit card assembly from the transponder processor.

As mentioned above, the distance measure equipment processor can be provided on a same circuit card assembly as a distance measure equipment receiver. The distance measure equipment processor and the transponder processor can be implemented on a same chip or a same circuit card assembly. Likewise, the distance measure equipment processor and the avionics processor can also be implemented on a same chip or a same circuit card assembly.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:
1. A system, comprising:
a transponder processor;
a top RF receiver configured to connect to a top antenna, wherein the transponder processor is configured to communicate using the top antenna;
a bottom RF receiver configured to connect to a first bottom antenna, wherein the transponder processor is configured to communicate using the first bottom antenna;
a distance measure equipment processor integrated with the transponder processor and configured to measure distance using a second bottom antenna;
a transmit/receive top/bottom TCAS/XPDR/DME antenna switch block coupled to a TX power amplifier, the top RF receiver, and the bottom RF receiver, selecting between the top antenna, the first bottom antenna comprising a TCAS/XPDR antenna, and the second bottom antenna, the second bottom antenna comprising a DME antenna, wherein the switch block comprises a three way switch coupling the TX power amplifier to one of three TX/RX switches, wherein:
a first of said TX/RX switches provides a switched connection between the top antenna and the TX power amplifier or the top antenna and a top RF RX input;

a second of said TX/RX switches provides a switched connection between the first bottom antenna and the TX power amplifier or a the first bottom antenna and a bottom RF RX input;

a third of said TX/RX switches provides a switched connection between the second bottom DME antenna and the TX power amplifier or the second bottom DME antenna and a DME RX input;

an avionics processor configured to communicate using the top antenna and the first bottom antenna, wherein the avionics processor is integrated with the transponder processor and the distance measure equipment processor;

wherein the transponder processor, the top RF receiver, the bottom RF receiver, and the distance measure equipment processor, the antenna switch block, and a distance measurement equipment receiver are provided as a single line replaceable unit; and wherein the switch block is configured to connect the TX power amplifier to one of the top antenna, the first bottom antenna, or the second bottom antenna.

2. The system of claim 1, wherein the avionics processor comprises a processor of a traffic collision avoidance system or a traffic alert and collision avoidance system.

3. The system of claim 1, wherein the avionics processor comprises a processor of a traffic awareness system or ADS-B IN system.

4. The system of claim 1, wherein the distance measure equipment processor is provided on a different circuit card assembly from the transponder processor.

5. The system of claim 1, wherein the distance measure equipment processor is provided on a same circuit card assembly as the distance measure equipment receiver.

6. The system of claim 1, wherein the distance measure equipment processor and the transponder processor are implemented on a same chip or a same circuit card assembly.

7. A method, comprising:
receiving a first transponder signal at a transponder processor via a top antenna and top RF receiver;
receiving a second transponder signal at the transponder processor via a first bottom antenna and a bottom RF receiver; performing a distance measure equipment function at a distance measure processor using a second bottom antenna, wherein the distance measure processor is integrated with the transponder processor;
receiving a first avionics signal at an avionics processor via the top antenna;
receiving a second avionics signal at the avionics processor via the first bottom antenna, wherein:

the avionics processor is integrated with the transponder processor and the distance measure equipment processor; and the transponder processor, top RF receiver, and bottom RF receiver are provided as a single line replaceable unit together with a top/bottom TCAS/XPDR/DME antenna switch block, a distance measure equipment receiver and the distance measure equipment processor; and wherein the top antenna, the first bottom antenna, and the second bottom antenna are coupled to the top/bottom TCAS/XPDR/DME antenna switch block coupled to a TX power amplifier, the top RF receiver, and the bottom RF receiver, configured to select between the top antenna, the first bottom antenna comprising a TCAS/XPDR antenna, and the second bottom antenna, the second bottom antenna comprising a DME antenna, wherein the switch block comprises a three way switch coupling the TX power amplifier to one of three TX/RX switches, wherein:

a first of said TX/RX switches provides a switched connection between the top antenna and the TX power amplifier or the top antenna and a top RF RX input;

a second of said TX/RX switches provides a switched connection between the first bottom antenna and the TX power amplifier or a the first bottom antenna and a bottom RF RX input;

a third of said TX/RX switches provides a switched connection between the second bottom DME antenna and the TX power amplifier or the second bottom DME antenna and a DME RX input; and wherein:
the switch block is configured to connect the TX power amplifier to one of the top antenna, the first bottom antenna, or the second bottom antenna.

8. The method of claim 7, wherein the avionics processor comprises a traffic collision avoidance system or traffic alert and collision avoidance system.

9. The method of claim 7, wherein the avionics processor comprises a traffic awareness system or ADS-B IN system.

10. The method of claim 7, wherein the distance measure equipment processor is provided on a different circuit card assembly from the transponder processor.

11. The method of claim 7, wherein the distance measure equipment processor is provided on a same circuit card assembly as a distance measure equipment receiver.

12. The method of claim 7, wherein the distance measure equipment processor and the transponder processor are implemented on a same chip or a same circuit card assembly.

* * * * *